Patented July 29, 1930

1,771,763

UNITED STATES PATENT OFFICE

EMIL BAUDER, OF BASEL, SWITZERLAND, ASSIGNOR TO J. R. GEIGY S. A., OF BASEL, SWITZERLAND, A FIRM

MANUFACTURE OF STABLE, DRY, EASILY SOLUBLE LEUCO PREPARATIONS OF VAT DYESTUFFS

No Drawing. Application filed August 8, 1927, Serial No. 211,639, and in Germany August 16, 1926.

According to the usual methods for the manufacture of stable leuco preparations, which are directly convenient for dyeing and printing wool, cotton or other textiles, it is first necessary by way of reduction to isolate the leuco-bodies of the vat dyestuffs and to transform them thereupon into a stable form by means of suitable additions. The finished products are in commercial use in form of pastes or powders dried in vacuo. As additions to be used for obtaining uniform and stable pastes, propyl alcohol, butyl alcohol and amyl alcohol are known. Furthermore the alkali metal salts of leuco-preparations are mixed with thickening or diluting agents, dissociation products of albuminoids, such as protalbin and lysalbin acid, salts of organic acids and hydroxyacids, their anhydrides, molasses, sugar, glue, sulphite pitch, etc., for the purpose of their stabilization.

Now, I have found that without isolation of the leuco compound stable leuco preparations can be obtained in dry and easily soluble form, if vat dyestuffs of any kind are pasted with di-basic alcohols (glycols) such as for example ethyleneglycol, propyleneglycol, ethylenethiodiglycol, and are reduced in presence of alkali with hydrosulphite or another reducing agent at the corresponding vat temperature. Thereupon the mass is evaporated in open apparatus at 70 to 80° C. to dry state and the dry material is ground.

The products thus obtained are stable, very easily soluble and can be used directly for dyeing and printing of textile materials.

The improved process can be applied to any vat dyestuffs, such as for example indigo, thioindigo, anthraquinones, derivative and substitution products thereof, etc.

The following example illustrates the process, the parts being by weight:

10 parts of 2-thionaphthen-acenaphthen-indigo are pasted with 20 parts of ethyleneglycol and mixed with 15 parts of caustic soda lye of 50° Bé. The whole is heated to 60° C. Thereupon, 15 to 20 parts of hydrosulphite dissolved in a quantity of water as small as possible are poured into the mass. The mixture is kept at this temperature until complete vatting has taken place. Then 10 parts of Glauber salt are added and the mass is dried at 70–80° C.

When producing preparations for printing purposes, the Glauber salt is advantageously replaced by sulphoricinate.

In the above example, instead of 2-thionaphthen-acenaphthenindigo any other vat dyestuff, such as indigo, thioindigo, anthraquinones and so on, may be used. Likewise, ethyleneglycol may be replaced by propyleneglycol, ethylenethiodiglycol etc. Furthermore, instead of hydrosulphite, any other reducing agent may be employed, such as sodium sulphide.

What I claim is:—

1. A process for the manufacture of stable, dry, easily soluble leuco preparations of vat dyestuffs, for dyeing and printing purposes, consisting in pasting vat dyestuffs with di-basic alcohols, treating them with a reducing agent in presence of alkali and subjecting the mass to a drying operation.

2. A process for the manufacture of stable, dry, easily soluble leuco preparations of vat dyestuffs, for dyeing and printing purposes, consisting in pasting vat dyestuffs with ethyleneglycol, treating them with a reducing agent in presence of alkali and subjecting the mass to drying operation.

3. A process for the manufacture of stable, dry, easily soluble leuco preparations of vat dyestuffs, for dyeing and printing purposes, consisting in pasting vat dyestuffs with di-basic alcohols, reducing them with hydrosulphite in presence of alkali and subjecting the mass to a drying operation.

In witness whereof I have hereunto signed my name this 28th day of July, 1927.

EMIL BAUDER.